(12) United States Patent
Ozaki et al.

(10) Patent No.: US 8,541,537 B2
(45) Date of Patent: Sep. 24, 2013

(54) BRANCHED POLYCARBONATE RESIN AND PROCESS FOR PRODUCING THE SAME

(75) Inventors: Takayuki Ozaki, Chiyoda-ku (JP);
Hiroshi Okamoto, Chiyoda-ku (JP);
Hiroshi Shuto, Chiyoda-ku (JP)

(73) Assignee: Teijin Chemicals, Ltd., Tokyo (JP)

( * ) Notice: Subject to any disclaimer, the term of this patent is extended or adjusted under 35 U.S.C. 154(b) by 0 days.

(21) Appl. No.: 13/499,789

(22) PCT Filed: Oct. 5, 2010

(86) PCT No.: PCT/JP2010/067815
§ 371 (c)(1),
(2), (4) Date: Jun. 8, 2012

(87) PCT Pub. No.: WO2011/043484
PCT Pub. Date: Apr. 14, 2011

(65) Prior Publication Data
US 2012/0253002 A1    Oct. 4, 2012

(30) Foreign Application Priority Data
Oct. 7, 2009 (JP) .................................. 2009-233568

(51) Int. Cl.
*C08G 64/00* (2006.01)
*C08G 63/02* (2006.01)

(52) U.S. Cl.
USPC ............................ 528/204; 528/196; 528/198

(58) Field of Classification Search
USPC .......................................................... 528/204
See application file for complete search history.

(56) References Cited

FOREIGN PATENT DOCUMENTS

| JP | 59-047228 | 3/1984 |
|---|---|---|
| JP | 6-065363 | 3/1994 |
| JP | 7-165899 | 6/1995 |
| JP | 7-165900 | 6/1995 |
| JP | 2005-126477 | 5/2005 |
| JP | 3693462 | 7/2005 |
| JP | 2005-336332 | 12/2005 |

OTHER PUBLICATIONS

International Search Report issued Nov. 2, 2010 in International Application No. PCT/JP2010/067815, of which the present application is the national stage.

*Primary Examiner* — Terressa Boykin
(74) *Attorney, Agent, or Firm* — Wenderoth, Lind & Ponack, L.L.P.

(57) ABSTRACT

This invention provides a branched polycarbonate resin obtained from a dihydric phenol compound, a branching agent, monohydric phenols and phosgene by an interfacial polymerization reaction method in the presence of an alkali aqueous solution and an organic solvent, the branched polycarbonate resin having features that: (i) the branching agent content (X) thereof is over 0.70 mol % but 1.50 mol % or less, (ii) the branching agent content (X) and the melt tension (Y) thereof at 280° C. satisfy the following expression (1), $3.8X-2.4 \leq Y \leq 3.8X+4.5$ (1), and (iii) the entire N content in the branched polycarbonate resin is 0 to 7 ppm.

6 Claims, 1 Drawing Sheet

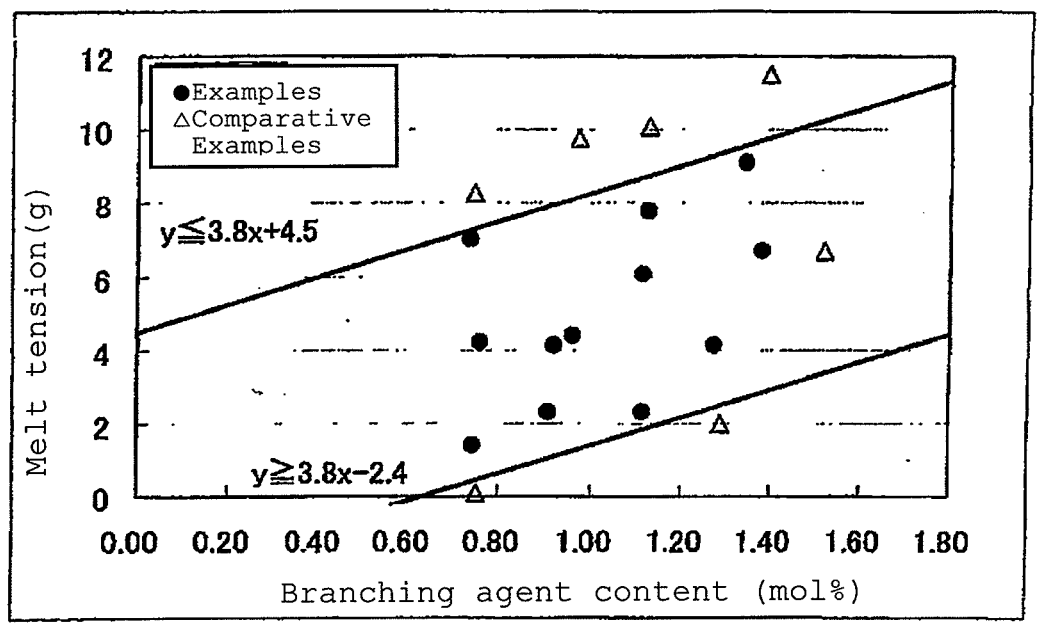

BRANCHED POLYCARBONATE RESIN AND PROCESS FOR PRODUCING THE SAME

TECHNICAL FIELD

This invention relates to a branched polycarbonate resin improved in thermal stability, moldability and drawdown property and a process for producing the same. More specifically, this invention relates to a branched polycarbonate resin that can be stably molded in extrusion molding, blow molding, injection molding and vacuum molding and that is suitable for a variety of uses and a process for producing the same.

BACKGROUND ART

A linear polycarbonate resin produced from bisphenol A, etc., is excellent in transparency, heat resistance and mechanical properties, and is widely used in various fields. However, when the above linear polycarbonate resin is used in the fields of extrusion molding, blow molding, injection molding and vacuum molding, a molded product sometimes has a thickness non-uniformity due to a low melt tension, or a drawdown is caused, so that no satisfactory molded articles are obtained in some cases. For overcoming this, there is disclosed a method that uses in polymerization a branched polycarbonate resin obtained by adding a branching agent having three or more functional groups (Patent Documents 1 to 3).

However, in the method of Patent Document 1, the melt tension of a branched polycarbonate resin is increased to some extent. However, when the amount of the branching agent is increased, the polycarbonate resin may be crosslinked and a gel can be generated. The thermal stability which the branched polycarbonate resin requires to have for extrusion molding, blow molding, injection molding and vacuum molding cannot be said to be sufficient.

In the method of Patent Document 2, the branched polycarbonate resin has high melt tension, while it is poor in moldability, and the surface state of a molded article obtained is degraded. Further, the thermal stability that the branched polycarbonate resin requires to have for extrusion molding, blow molding, injection molding and vacuum molding cannot be said to be sufficient.

In the method of Patent Document 3, the branched polycarbonate resin has a relatively high melt tension. However, when the amount of a branching agent is increased, the polycarbonate resin is crosslinked to possibly generate a gel, therefore no satisfactory branching property is obtained. Further, a gel might get mixed with a molded article, and it impairs the impact resistance and transparency of the polymer.
(Patent Document 1) JP-A 59-047228
(Patent Document 2) Japanese Patent No. 3,693,462
(Patent Document 3) JP-A 2005-126477

DISCLOSURE OF THE INVENTION

It is an object of this invention to provide a branched polycarbonate resin having a high content of a branching agent, which has good melt tension, virtually causes no drawdown and permits stable molding in extrusion molding, blow molding, injection molding and vacuum molding. It is another object of this invention to provide a process for producing a branched polycarbonate resin of which the gel generation is remarkably small and which can be stably produced.

The present inventors have found that a branched polycarbonate resin having a branching agent content and a melt tension under a specific temperature in specific ranges and having an entire N content of 0 to 7 ppm has good melt tension, virtually causes no drawdown and is easily processed, and this invention has been accordingly completed.

That is, according to this invention, there are provided
1. a branched polycarbonate resin obtained from a dihydric phenol compound, a branching agent, monohydric phenols and phosgene by an interfacial polymerization method in the presence of an alkali aqueous solution and an organic solvent, the branched polycarbonate resin having features that:
   (i) the branching agent content (X) thereof is over 0.70 mol % but 1.50 mol % or less,
   (ii) the branching agent content (X) and the melt tension (Y) thereof at 280° C. satisfy the following expression (I), $$3.8X-2.4 \leq Y \leq 3.8X+4.5 \tag{I}$$

and
   (iii) the entire N content in the branched polycarbonate resin is 0 to 7 ppm,
2. the branched polycarbonate resin as recited in the above 1, which has a viscosity average molecular weight in the range of $1.8 \times 10^4$ to $3.2 \times 10^4$,
3. the branched polycarbonate resin as recited in the above 1, wherein the dihydric phenol compound is 2,2-bis(4-hydroxyphenyl)propane,
4. the branched polycarbonate resin as recited in the above 1, wherein the branching agent is a compound formed by substituting 3 or more hydroxyphenyl groups on an alkane having 2 to 8 carbon atoms,
5. the branched polycarbonate resin as recited in the above 1, wherein the monohydric phenols are compounds selected from the class consisting of p-tert-butylphenol, p-tert-octylphenol, p-cumylphenol, 4-hydroxybenzophenone and phenol,
6. a process for producing the branched polycarbonate resin recited in the above 1, which comprises the steps of
   (i) blowing phosgene into an alkali aqueous solution containing a dihydric phenol compound and a branching agent in the presence of an organic solvent to allow them to react and thereby obtaining a solution containing a polycarbonate oligomer,
   (ii) charging monohydric phenols into the thus-obtained solution to emulsify the solution, and
   (iii) polymerizing the emulsified solution without stirring,
7. a production process as recited in the above 6, wherein the dihydric phenol compound is 2,2-bis(4-hydroxyphenyl)propane,
8. a production process as recited in the above 6, wherein the branching agent is a compound formed by substituting 3 or more hydroxyphenyl groups on an alkane having 2 to 8 carbon atoms, and
9. a production process as recited in the above 6, wherein the monohydric phenols are compounds selected from the group consisting of p-tert-butylphenol, p-tert-octylphenol, p-cumylphenol, 4-hydroxybenzophenone and phenol.

BRIEF EXPLANATION OF DRAWINGS

FIG. 1 shows the relationships between the branching agent contents (X) and the melt tensions (Y) of branched polycarbonate resin pellets obtained in Examples and Comparative Examples.

PREFERRED EMBODIMENTS OF THE INVENTION

This invention will be explained in detail hereinafter.
(Dihydric Phenol Compound)

The dihydric phenol compound used in this invention includes 2,2-bis(4-hydroxyphenyl)propane (so-called bisphenol A), hydroquinone, resorcinol, 4,4'-bisphenol, 1,1-bis(4-hydroxyphenyl)ethane, 2,2-bis(4-hydroxy-3-methylphenyl)propane, 2,2-bis(4-hydroxyphenyl)butane, 1,1-bis(4-hydroxyphenyl)-1-phenylethane, 1,1-bis(4-hydroxyphenyl)cyclohexane, 1,1-bis(4-hydroxyphenyl)-3,3,5-trimethylcyclohexane, 2,2-bis(4-hydroxyphenyl)pentane, 4,4'-(p-phenylenediisopropylidene)diphenol, 4,4'-(m-phenylenediisopropylidene)diphenol, 1,1-bis(4-hydroxyphenyl)-4-isopropylcyclohexane, bis(4-hydroxyphenyl) oxide, bis(4-hydroxyphenyl)sulfide, and bis(4-hydroxyphenyl)sulfoxide. These may be used alone or in combination of two or more. Out of these, 2,2-bis(4-hydroxyphenyl)propane is preferred.

(Branching Agent)

The branching agent used in this invention refers to trihydric or higher polyhydric phenols or derivatives of these. The branching agent includes 1,1,1-tris(4-hydroxyphenyl)ethane, 4,6-dimethyl-2,4,6-tri(4-hydroxyphenyl)heptene-2,4,6-dimethyl-2,4,6-tri(4-hydroxyphenyl)heptanes, 1,3,5-tri(4-hydroxyphenyl)benzene, 2,6-bis(2-hydroxy-5-methylbenzyl)-4-methylphenol, tetra(4-hydroxyphenyl)methane, trisphenol, bis(2,4-dihydroxyphenyl)ketone, phloroglucin, phloroglucide, isantin bisphenol, 1,4-bis(4,4-dihydroxytriphenylmethyl)benzene, 4,6-dimethyl-2,4,6-tri(4-hydroxyphenyl)pentene, 3,3-bis(4-hydroxyaryl)oxyindol, 5-choloroisatin, 5,7-dicloroisatin, 2,4,4-trihydroxybenzophenone, 2,2,4,4-tetrahydroxybenzophenone, 2,4,4-trihydroxydiphenyl ether, 2,2,4,4-tetrahydroxydiphenyl ether, 2,4,4-trihydroxyphenyl-2-propane, 2,2-bis(2,4-dihyroxy)propane, 2,2,4,4-tetrahydroxydiphenylmethane, 1-[α-methyl-α-(4-hydroxyphenyl)ethyl]-4-[α,α-bis(4-hydroxyphenyl)ethyl]benzene, α,α',α''-tris(4-hydroxyphenyl)-1,3,5-triisopropylbenzene, 2,2,-bis[4,4-bis(4-hydroxyphenyl)cyclohexyl]-propane, 2,6-bis(2-hydroxy-5-isopropylbenzyl)-4-isopropylphenol, bis[2-hydroxy-3-(2-hydroxy-5-isopropylbenzyl)-5-methylphenyl]methane, tris(4-hydroxyphenyl)phenylmethane, 2,4,7-trihydroxyflavan, 2,4,4-trimethyl-2,4,7-trihydroxyflavan, 1,3-bis(2,4-hydroxyphenylisopropyl)benzene, 5-bromoisatin, trimellitic acid, pyromellitic acid, benzophenonetetracarboxylic acid and acid chlorides of these. These may be used alone or in combination of two or more. Out of these, a compound formed by substituting three or more hydroxyphenyl groups on an alkaline having 2 to 8 carbon atoms such as 1,1,1-tris(4-hydroxyphenyl)ethane is preferred. The above polyhydric phenols may be used in the form of a solid or a melt or a solution of a solid or a melt in an alkaline aqueous solution or an organic solvent.

(Monohydric Phenols)

In this invention, the monohydric phenols (terminal capping agent) used as a molecular weight adjusting agent may have any structure, and are not specially limited. For example, they include p-tert-butylphenol, p-tert-octylphenol, p-cumylphenol, 4-hydroxybenzophenone and phenol. Out of these, p-tert-butylphenol is preferred. Desirably, these monohydric phenols are introduced in an amount of at least 5 mol %, preferably at least 10 mol % based on all of the terminals of the obtained polycarbonate resin. Further, the monohydric phenols may be used alone or in combination of two or more. The above monohydric phenols can be added in the form of a solid or a melt or in the form of a solution of a solid or a melt in an alkaline aqueous solution or organic solvent.

(Alkaline Aqueous Solution)

As the alkaline aqueous solution in this invention, an aqueous solution of an alkali metal hydroxide such as sodium hydroxide, potassium hydroxide, etc., is used.

The concentration of the aqueous solution is preferably 5.5 to 8.5% by weight. Further, the alkali is preferably used in an amount of 1.7 to 3.0 moles per mole of the dihydric phenol.

(Organic Solvent)

The organic solvent includes halogenated hydrocarbons such as methylene chloride, tetrachloroethane, trichloroethane, dichloroethane, chlorobenzene and chloroform. In particular, methylene chloride is preferably used.

(Branching Agent Content (X))

The branching agent content (X) in the branched polycarbonate resin is over 0.70 mol % but 1.50 mol % or less, preferably 0.72 mol % or more but 1.45 mol % or less, more preferably, 0.74 mol % or more but 1.40 mol % or less. The branching agent content (X) refers to a molar amount of the branching agent based on the total molar amount of the dihydric phenol compound (molar amount of branching agent/total molar amount of dihydric phenol compound×100 mol %). The branching agent content (X) is measured using $^1$H-NMR (JNM-AL400 supplied by JEOL Ltd.). When the branching agent content (X) is 0.70 mol % or less, a drawdown is easily caused. Further, when the branching agent exceeds 1.50 mol %, the polycarbonate resin is crosslinked to generate a gel, so that no satisfactory branching properties can be obtained. And, a gel is get mixed with a molded product, and, undesirably, the impact resistance and transparency of the polymer are degraded.

In the branched polycarbonate resin of this invention, the branching agent content (X) and the melt tension (Y) at 280° C. satisfy the following expression (1), preferably satisfy the following expression (2).

$$3.8X-2.4 \leq Y \leq 3.8X+4.5 \quad (1)$$

$$3.8X-1.8 \leq Y \leq 3.8X+3.9 \quad (2)$$

When the melt tension is Y<3.8 X−2.4, undesirably, the melt tension is too low, and a drawdown is easily caused. And, blow molding is also difficult. Further, when the melt tension is Y>3.8 X+4.5, undesirably, the melt tension is too high, and the flowability is poor. And, the branched polycarbonate resin is inferior in moldability, and the surface state of a molded product is degraded.

The drawdown property is improved as the amount of the branching agent is increased. However, with an increase in the branching agent, the polycarbonate resin generates a gel by crosslinking, and the impact resistance and the transparency are degraded, so that it is required to adjust the amount of the branching agent such that it does not generate a gel. Further, the melt tension is increased with an increase in the amount of the branching agent, while an increase in the melt tension deteriorates moldability, so that the amount of the branching agent is required to be an amount in which a proper melt tension can be materialized, that is, the amount of the branching agent in the branched polycarbonate resin is required to be over 0.70 mol % but 1.50 mol % or less.

(Entire N Content)

In the branched polycarbonate resin of this invention, the entire N content in the branched polycarbonate resin is 0 to 7 ppm, preferably 0 to 5 ppm. When the entire N content in the branched polycarbonate resin exceeds 7 ppm, undesirably, the thermal stability is degraded (ΔE exceeds 0.5).

The method of adjusting the entire N content to the above range includes a method in which the amount of the reaction catalyst used for the reaction promotion is remarkably decreased, a method in which the reaction is carried out in the absence of a catalyst and a method in which a reaction catalyst is added when the reaction mixture comes to have a viscosity average molecular weight that is 20% or more of the desired viscosity average molecular weight. Of these, a method in which the reaction is carried out in the absence of a catalyst is preferred.

(Viscosity Average Molecular Weight)

The viscosity average molecular weight of the branched polycarbonate resin of this invention is preferably in the range of $1.8 \times 10^4$ to $3.2 \times 10^4$, more preferably in the range of $2.0 \times 10^4$ to $2.7 \times 10^4$. When the above molecular weight exceeds $3.2 \times 10^4$, the melt tension becomes too high, and the branched polycarbonate resin is poor in moldability. When it is less than $1.8 \times 10^4$, undesirably, the branched polycarbonate resin is not improved in melt tension, and extrusion molding and blow molding thereof become difficult. From the viewpoint of easy moldability, further, the branched polycarbonate resin preferably has a viscosity average molecular weight of $2.15 \times 10^4$ to $3.2 \times 10^4$ for extrusion molding and also has a viscosity average molecular weight of $1.8 \times 10^4$ to $2.8 \times 10^4$ for injection molding.

(Production of Branched Polycarbonate Resin)

The branched polycarbonate resin of this invention can be produced by the steps of (i) blowing phosgene into an alkali aqueous solution containing a dihydric phenol compound and a branching agent in the presence of an organic solvent to allow them to react and thereby obtaining a solution containing a polycarbonate oligomer, (ii) charging monohydric phenols into the thus-obtained solution to emulsify the solution, and (iii) polymerizing the emulsified solution without stirring.

As a reaction catalyst for promoting the reaction, there may be used a catalyst that includes tertiary amines such as triethylamine, tributylamine, tetra-n-butylammonium bromide and tetra-n-butylphosphonium bromide, quaternary ammonium compounds and quaternary phosphonium compounds. The amount of the reaction catalyst based on the dihydric phenol compound is preferably 0.002 mol % or less, more preferably 0.001 mol % or less. It is particularly preferred to carry out the above reaction in the absence of a catalyst. When it exceeds 0.002 mol %, the melt tension becomes too high as compared with the amount of a branching agent, or a gel is generated. Further, not only a catalyst reacts with a choroformate group to increase the amount of a urethane bond that is thermally unstable, but also the catalyst remains thereby to increase the entire N content in the branched polycarbonate resin, so that, undesirably, the impact resistance, transparency and heat resistance of the branched polycarbonate resin are decreased. Therefore, the above reaction is preferably carried out in the absence of a catalyst. In this case, the reaction temperature is normally preferably 0 to 40° C., more preferably 15 to 38° C. Preferably, the reaction time period is approximately 10 minutes to 5 hours, and the pH during the reaction is maintained at 9.0 or more, more preferably, at 11.0 to 13.8.

The method of emulsifying the solution after the charging of monohydric phenols in the above interfacial polymerization reaction is not specially limited, while it includes a method of stirring with a stirrer or a method of adding an alkali aqueous solution. The stirrer includes simple stirrers such as a paddle, a propeller, a turbine and an oar-type blade, high-speed stirrers such as a homogenizer, a mixer and a homomixer and ultrasonic emulsifiers such as a static mixer, a colloid mill, orifice mixer and a flow jet mixer. Of these, a homomixer and a static mixer are preferred in a method of the polymerization in the absence of a catalyst.

The organic solvent solution containing the thus-obtained branched polycarbonate resin is subjected to washing, granulation and drying, whereby the branched polycarbonate resin (powder) of this invention can be obtained. Further, the above powder is melt-extruded and pelletized, whereby the branched polycarbonate resin (pellets) of this invention can be obtained. The washing, granulation and drying are not specially limited, and known methods therefor can be employed.

(Phosphorus-Containing Thermal Stabilizer)

The branched polycarbonate resin of this invention preferably contains a phosphorus-containing thermal stabilizer. The phosphorus-containing thermal stabilizer includes phosphorous acid, phosphoric acid, phosphonic acid and esters of these. Specifically, it includes trisphenyl phosphite, tris(nonylphenyl)phosphite, tris(2,4-di-tert-butylpyhenyl)phosphite, tris(2,6-di-tert-butylpyhenyl)phosphite, tridecyl phosphite, trioctyl phosphite, trioctadecyl phosphite, didecylmonophenyl phosphite, dioctylmonophenyl phosphite, diisopropylmonophenyl phosphite, monobutyldiphenyl phosphite, monodecyldiphenyl phosphite, monooctyldiphenyl phosphite, bis(2,6-di-tert-butyl-4-methylphenyl)pentaerythritol diphosphite, 2,2-methylenebis(4,6-di-tert-butylphenyl)octyl phosphite, bis(nonylphenyl)pentaerythritol diphosphite, bis (2,4-di-tert-butylphenyl)pentaerythritol diphosphite, distearylpentaerythritol diphosphite, tributylphosphate, triethyl phosphate, trimethyl phosphate, triphenyl phosphate, diphenyl monoorthoxenyl phosphate, dibutyl phosphate, dioctyl phosphate, diisopropyl phosphate, tetrakis(2,4-di-tert-butylphenyl)-4,4'-biphenylenediphosphinate, dimethyl benzenephosphonate, diethyl benzenephosphonate and dipropyl benzenephosphonate.

Of these, tris(nonyl)phenyl phosphite, tris(2,4-di-tert-butylphenyl)phosphite, tris(2,6-di-tert-butylpyhenyl)phosphite and tetrakis(2,4-di-tert-butylphenyl)-4,4'-biphenylenediphosphinate are preferred. In particular, tris(2,4-di-tert-butylphenyl)phosphite is preferred. These may be used alone or in combination of two or more. The amount of the thermal stabilizer based on the branched polycarbonate resin is preferably 10 to 10,000 ppm, more preferably 20 to 1,000 ppm. When the amount of the phosphorus-containing thermal stabilizer is less than 10 ppm, the improvement in thermal stability is not sufficient. When it exceeds 10,000 ppm, undesirably, the durability is decreased.

The method of incorporating the above thermal stabilizer into the branched polycarbonate resin includes a method of adding it to an organic solvent solution containing the branched polycarbonate resin, a method of adding it to a branched polycarbonate resin powder or a method of feeding it to a melt-extruder, and any method of these may be employed. The thermal stabilizer may be added as it is or may be added in the form of a solution of it in a solvent.

A linear polycarbonate resin can be blended with the branched polycarbonate resin of this invention in such an amount that the features of this invention are not impaired (suitably in an amount of 10% by weight or less).

The branched polycarbonate resin of this invention can further contain an antioxidant, a mold release agent (fatty acid ester, etc.), a weathering agent (ultraviolet absorbent), a nucleating agent, a lubricant, a plasticizer, an antistatic agent, a brightener, an anti-fungus agent, a colorant (pigment and dye), a filler, a reinforcement, a polymer such as other resin and rubber, and a modifying and improving agent such as a flame retardant so long as they do not impair the features of this invention. When it is used as a construction material in the field of a sheet, it is desirable to incorporate a weathering agent. In an expanded sheet, it is desirable to incorporate a nucleating agent. The weathering agent includes 2-(2-hydroxy-5-tert-octylphenyl)benzotriazole, 2-(2H-benzotriazol-2-yl)4,6-bis(1-methyl-1-phenylethyl)phenol, 2-[5-chloro (2H)-benzotriazol-2-yl]-4-methyl-6-(tert-butyl)phenol and 2,2'-methylenebis[4-(1,1,3,3-tetramethylbutyl)-6-(2H-benzotriazol-2-yl)phenol.

Being excellent in transparency and drawdown property, the branched polycarbonate resin of this invention is suitably used in various fields. Specifically, it is suitable for uses in molding such as injection molding, extrusion molding and blow molding. Examples of these use fields include electric and electronic parts such as a light guiding plate, a prism sheet and a lighting fixture.

EXAMPLES

This invention will be further explained with reference to Examples hereinafter, while this invention shall not be limited thereto. "Part" stands for "part by weight" unless otherwise specified. Evaluations were made according to the following methods.

(1) Melt tension (Y); Measured as a tension generated at a temperature of 280° C., an extrusion speed of 10 mm/minute, a withdrawing speed of 157 mm/second and at an orifice L/D=8/2.1.

(2) Measurement of entire N content; Measured with a trace nitrogen analyzer (chemiluminescence method) TN-10 model supplied by Mitsubishi Chemical Corporation.

(3) Thermal stability; Sample pellets were dried at 120° C. for 5 hours, and then molded with an injection molding machine (SG-150, supplied by Sumitomo Heavy Industries, Ltd.) under conditions of a cylinder temperature of 350° C., a screw speed of 63 rpm, an injection speed of 40 mm/second, an injection pressure of 90 MPa, back pressures of 10 MPa at a first stage and 5 MPa at a second stage, a mold temperature of 80° C., a mold clamping pressure of 80 tons and mold cooling time periods of 20 seconds, 10 seconds at a dwelling pressure of 90 MPa and 10 seconds at 30 MPa, and a test piece (a length 70 mm, a width 50 mm and a thickness 2 mm) that was caused to dwell for 10 minutes and a test piece that was not caused to dwell were prepared and measured for a change ($\Delta E$) in hue. The test pieces were measured for L, a and b values with a color difference meter (supplied by Nippon Denshoku Industries, Co., Ltd.) and a change in hue was calculated on the basis of the following expression.

$$\Delta E = [(L'-L)^2 + (a'-a)^2 + (b'-b)^2]^{1/2}$$

(L, a and b from the test piece that was not caused to dwell, and L', a' and b' from the test piece that was caused to dwell).

(4) Moldability; The pieces prepared for the evaluation for thermal stability in the above (3) were visually evaluated for a surface irregularity and a sink mark (○=none of them occurred, x=occurred).

(5) Measurement of drawdown property (Rd); A 100 mm×30 mm square water bottle was molded thorough a 60 mmφ×2 mm die with a stress-breaking type screw with a molding machine SE-51/BA2 of Sumitomo-Bekoom K.K., and Rd was calculated on the basis of the following expression using a parison length (L1) from which influences by the drawdown and swelling in the above case were removed and an actual parison length (L2=60 cm). In the drawdown property, Rd was evaluated, or Rd≦42 was taken as fine (○) and Rd>42 was taken as poor (x).

$$Rd = (L2-L1)/L2 \times 100$$

(6) Viscosity average molecular weight (M) of branched polycarbonate resin; A specific viscosity ($\eta_{sp}$) determined from a solution of 0.7 g of a branched polycarbonate resin in 100 ml of methylene chloride at 20° C. was inserted into the following expression, and M was determined.

$\eta_{sp}/c = [\eta] + 0.45 \times [\eta]^2 c$ (in which $[\eta]$ is an intrinsic viscosity)

$$[\eta] = 1.23 \times 10^{-4} M^{0.83}$$

$$c = 0.7$$

(7) Whether or not a gelling occurred; Strands that were measured for a melt viscosity were dissolved in methylene chloride, and the solution was visually evaluated for the existence or nonexistence of a gelling (Yes means a gelling occurred, and No means no gelling occurred).

(8) Branching agent content (X) in branched polycarbonate; Sample pellets were measured for a branching agent content (X) on the basis of $^1$H-NMR (JNM-AL400 supplied by JEOL).

Example 1

Step of Obtaining Polycarbonate Oligomer

A reactor with a thermometer, a stirrer and a reflux condenser was charged with 2,340 parts of deionized water, 947 parts of a 25% sodium hydroxide aqueous solution and 0.7 part of hydrosulphite, and 710 parts of bisphenol A was dissolved with stirring (bisphenol A solution). Then, 2,299 parts of methylene chloride, 112 parts of a 48.5% sodium hydroxide aqueous solution and 38.1 parts (1.00 mol %) of a solution of 25% concentration of 1,1,1-tris(4-hydroxyphenyl)ethane in a 14% concentration sodium hydroxide aqueous solution were added, and 354 parts of phosgene was introduced over about 90 minutes by blowing at 15 to 25° C. to carry out a phosgene forming reaction, whereby a polycarbonate oligomer was obtained.

(Emulsification)

After the phosgene forming was completed, 219 parts of a methylene chloride solution of 11% concentration p-tert-butylphenol and 88 parts of a 48.5% sodium hydroxide aqueous solution were added, and the stirring was terminated. After the reaction product was subjected to separation by allowing it to stand for 10 minutes, it was emulsified by stirring, and after 5 minutes, it was treated with a homomixer (Tokushu Kika Kogyo (Primix Corporation)) at a stirring speed of 1,200 rpm at a pass frequency of 35 times to give a highly emulsified dope.

(Polymerization Without Stirring)

The above highly emulsified dope was allowed to react in a polymerization vessel (with a stirrer) under stirring-free conditions at a temperature of 35° C. for 3 hours to complete the polymerization.

(Purification, Drying)

After completion of the reaction, 5,728 parts of methylene chloride was added to the reaction product to dilute it, a methylene chloride phase was separated from the reaction mixture, 5,000 parts of deionized water was added to the separated methylene chloride phase and they were mixed with stirring. Then, the stirring was terminated to separate the mixture into an aqueous phase and an organic phase. The above procedures of washing with deionized water were repeated (4 times) until the aqueous phase came to have an electric conductivity almost equivalent to that of deionized water, to give a purified polycarbonate resin solution. Then, methylene chloride was evaporated from the above purified polycarbonate resin solution with a 1,000 L kneader with 100 L of deionized water charged therein at a liquid temperature of 75° C., to give a powder. 25 Parts of the above powder and 75 parts of water were charged into a hot water treatment vessel with a stirrer and mixed at a water temperature of 95° C. for 30 minutes with stirring.

Then, a mixture of the above powder and water was separated with a centrifugal separator to give a powder containing 0.5% by weight of methylene chloride and 45% by weight of water. Then, the above powder was continuously supplied to a conducted heating grooved two-blade stirring continuous dryer made of SUS316L controlled under 140° C. at a rate of 50 kg/hour (as a polycarbonate resin), and dried under conditions of an average drying time period of 3 hours, to give a powder.

(Melt Kneading)

To the above powder were added 0.03% by weight of tris(2,4-di-tert-butylphenyl)phosphite, 0.3% by weight of higher fatty acid pentaerythritol ester and 0.000035% by weight of an anthraquinone dye, and they were mixed. The resultant powder was melt-kneaded and extruded with a vented twin-screw extruder (TEM-50B, supplied by Toshiba Machine Co., Ltd.) at a cylinder temperature of 280° C. with performing suction and deaeration with a dry vacuum pump, to give pellets.

The thus-obtained branched polycarbonate resin pellets had a branching agent content (X) of 0.96 mol %, a viscosity average molecular weight of 25,100 and an entire N content, found in the pellets, of 5 ppm and a melt tension of 4.4 g, and there was found no occurrence of a gelling. Further, the above pellets were evaluated for thermal stability, moldability and drawdown property, and Table 1 shows the results.

Example 2

Example 1 was repeated except that the amount of phosgene was changed to 357 parts, that the amount of the solution of 25% concentration of 1,1,1-tris(4-hydroxyphenyl)ethane in a 14% concentration sodium hydroxide aqueous solution was changed to 57.2 parts (1.50 mol %) and that the amount of the methylene chloride solution of 11% concentration p-tert-butylphenol was changed to 240 parts, and Table 1 shows the evaluation results of the thus-obtained branched polycarbonate resin pellets.

Example 3

Example 1 was repeated except that the amount of phosgene was changed to 352 parts, that the amount of the solution of 25% concentration of 1,1,1-tris(4-hydroxyphenyl)ethane in a 14% concentration sodium hydroxide aqueous solution was changed to 30.5 parts (0.80 mol %) and that the amount of the methylene chloride solution of 11% concentration p-tert-butylphenol was changed to 209 parts, and Table 1 shows the evaluation results of the thus-obtained branched polycarbonate resin pellets.

Example 4

Example 1 was repeated except that the amount of phosgene was changed to 355 parts, that the amount of the solution of 25% concentration of 1,1,1-tris(4-hydroxyphenyl)ethane in a 14% concentration sodium hydroxide aqueous solution was changed to 45.7 parts (1.20 mol %) and that the amount of the methylene chloride solution of 11% concentration p-tert-butylphenol was changed to 228 parts, and Table 1 shows the evaluation results of the thus-obtained branched polycarbonate resin pellets.

Example 5

Example 1 was repeated except that the amount of phosgene was changed to 350 parts, that the amount of the solution of 25% concentration of 1,1,1-tris(4-hydroxyphenyl)ethane in a 14% concentration sodium hydroxide aqueous solution was changed to 30.5 parts (0.80 mol %) and that the amount of the methylene chloride solution of 11% concentration p-tert-butylphenol was changed to 154 parts, and Table 1 shows the evaluation results of the thus-obtained branched polycarbonate resin pellets.

Example 6

Example 1 was repeated except that the amount of phosgene was changed to 353 parts, that the amount of the solution of 25% concentration of 1,1,1-tris(4-hydroxyphenyl)ethane in a 14% concentration sodium hydroxide aqueous solution was changed to 45.7 parts (1.20 mol %) and that the amount of the methylene chloride solution of 11% concentration p-tert-butylphenol was changed to 169 parts, and Table 1 shows the evaluation results of the thus-obtained branched polycarbonate resin pellets.

Example 7

Example 1 was repeated except that the amount of phosgene was changed to 354 parts, that the amount of the solution of 25% concentration of 1,1,1-tris(4-hydroxyphenyl)ethane in a 14% concentration sodium hydroxide aqueous solution was changed to 53.4 parts (1.40 mol %) and that the amount of the methylene chloride solution of 11% concentration p-tert-butylphenol was changed to 177 parts, and Table 1 shows the evaluation results of the thus-obtained branched polycarbonate resin pellets.

Example 8

Example 1 was repeated except that the amount of phosgene was changed to 355 parts, that the amount of the solution of 25% concentration of 1,1,1-tris(4-hydroxyphenyl)ethane in a 14% concentration sodium hydroxide aqueous solution was changed to 38.1 parts (1.00 mol %) and that the amount of the methylene chloride solution of 11% concentration p-tert-butylphenol was changed to 262 parts, and Table 1 shows the evaluation results of the thus-obtained branched polycarbonate resin pellets.

Example 9

Example 1 was repeated except that the amount of phosgene was changed to 354 parts, that the amount of the solution of 25% concentration of 1,1,1-tris(4-hydroxyphenyl)ethane in a 14% concentration sodium hydroxide aqueous solution was changed to 30.5 parts (0.80 mol %) and that the amount of the methylene chloride solution of 11% concentration p-tert-butylphenol was changed to 253 parts, and Table 1 shows the evaluation results of the thus-obtained branched polycarbonate resin pellets.

Example 10

Example 1 was repeated except that the amount of phosgene was changed to 357 parts, that the amount of the solution of 25% concentration of 1,1,1-tris(4-hydroxyphenyl)ethane in a 14% concentration sodium hydroxide aqueous solution was changed to 45.7 parts (1.20 mol %) and that the amount of the methylene chloride solution of 11% concentration p-tert-butylphenol was changed to 270 parts, and Table 1 shows the evaluation results of the thus-obtained branched polycarbonate resin pellets.

Example 11

Example 1 was repeated except that the amount of phosgene was changed to 358 parts, that the amount of the solution of 25% concentration of 1,1,1-tris(4-hydroxyphenyl)ethane in a 14% concentration sodium hydroxide aqueous solution was changed to 53.4 parts (1.40 mol %) and that the amount of the methylene chloride solution of 11% concentration p-tert-butylphenol was changed to 276 parts, and Table 1 shows the evaluation results of the thus-obtained branched polycarbonate resin pellets.

Example 12

Branched polycarbonate resin pellets were obtained in the same manner as in Example 1 except that 0.003 part of triethylamine (0.001 mol % based on bisphenol A) was added as a reaction catalyst before the emulsification, that the amount of the methylene chloride solution of 11% concentration p-tert-butylphenol was changed to 228 parts and further that 0.3 part by volume of a hydrochloric acid aqueous solution having a pH of 3.0 was added per 1 part by volume of the methylene chloride phase separated from the reaction mixture to acid-extract triethylamine followed by washing with deionized water. Table 1 shows the evaluation results of the thus-obtained branched polycarbonate resin pellets.

Comparative Example 1

Example 1 was repeated except that the amount of phosgene was changed to 357 parts, that the amount of the solution of 25% concentration of 1,1,1-tris(4-hydroxyphenyl)ethane in a 14% concentration sodium hydroxide aqueous solution was changed to 61.0 parts (1.60 mol %) and that the amount of the methylene chloride solution of 11% concentration p-tert-butylphenol was changed to 245 parts, and Table 1 shows the evaluation results of the thus-obtained branched polycarbonate resin pellets.

Comparative Example 2

Example 1 was repeated except that the amount of phosgene was changed to 350 parts, that the amount of the solution of 25% concentration of 1,1,1-tris(4-hydroxyphenyl)ethane in a 14% concentration sodium hydroxide aqueous solution was changed to 30.5 parts (0.80 mol %) and that the amount of the methylene chloride solution of 11% concentration p-tert-butylphenol was changed to 135 parts, and Table 1 shows the evaluation results of the thus-obtained branched polycarbonate resin pellets.

Comparative Example 3

Example 1 was repeated except that the amount of phosgene was changed to 352 parts, that the amount of the solution of 25% concentration of 1,1,1-tris(4-hydroxyphenyl)ethane in a 14% concentration sodium hydroxide aqueous solution was changed to 45.7 parts (1.20 mol %) and that the amount of the methylene chloride solution of 11% concentration p-tert-butylphenol was changed to 152 parts, and Table 1 shows the evaluation results of the thus-obtained branched polycarbonate resin pellets.

Comparative Example 4

Example 1 was repeated except that the amount of phosgene was changed to 354 parts, that the amount of the solution of 25% concentration of 1,1,1-tris(4-hydroxyphenyl)ethane in a 14% concentration sodium hydroxide aqueous solution was changed to 57.2 parts (1.50 mol %) and that the amount of the methylene chloride solution of 11% concentration p-tert-butylphenol was changed to 165 parts, and Table 1 shows the evaluation results of the thus-obtained branched polycarbonate resin pellets.

Comparative Example 5

Example 1 was repeated except that the amount of phosgene was changed to 355 parts, that the amount of the solution of 25% concentration of 1,1,1-tris(4-hydroxyphenyl)ethane in a 14% concentration sodium hydroxide aqueous solution was changed to 30.5 parts (0.80 mol %) and that the amount of the methylene chloride solution of 11% concentration p-tert-butylphenol was changed to 270 parts, and Table 1 shows the evaluation results of the thus-obtained branched polycarbonate resin pellets.

Comparative Example 6

Example 1 was repeated except that the amount of phosgene was changed to 358 parts, that the amount of the solution of 25% concentration of 1,1,1-tris(4-hydroxyphenyl)ethane in a 14% concentration sodium hydroxide aqueous solution was changed to 53.4 parts (1.40 mol %) and that the amount of the methylene chloride solution of 11% concentration p-tert-butylphenol was changed to 295 parts, and Table 1 shows the evaluation results of the thus-obtained branched polycarbonate resin pellets.

Comparative Example 7

Branched polycarbonate resin pellets were obtained in the same manner as in Example 1 except that 0.006 part of triethylamine (0.0025 mol % based on bisphenol A) was added as a reaction catalyst before the emulsification, that the amount of the methylene chloride solution of 11% concentration p-tert-butylphenol was changed to 236 parts and further that 0.3 part by volume of a hydrochloric acid aqueous solution having a pH of 3.0 was added per 1 part by volume of the methylene chloride phase separated from the reaction mixture to acid-extract triethylamine followed by washing with deionized water. Table 1 shows the evaluation results of the thus-obtained branched polycarbonate resin pellets.

According to Table 1 and FIG. 1, the effect of this invention will be specifically explained as follows. That is, all of Examples 1 to 12 satisfy the expression of $3.8 \text{ X} -2.4 \leq Y \leq 3.8 \text{ X}+4.5$ that shows the relationship between the branching agent content (X) and the melt tension (Y) at 280° C., and they are excellent in all of thermal stability, moldability and drawdown property. When strands were dissolved after the measurement for a melt viscosity was made in each of Examples 1 to 12, no occurrence of a gelling was observed.

In Comparative Example 1, the pellets were excellent in thermal stability, moldability and drawdown property. However, when strands were dissolved after the measurement for a melt viscosity was made, the occurrence of a gelling was observed.

Comparative Examples 2, 3 and 4 failed to satisfy the expression (1), their melt tensions became large, and their moldability was degraded. Further, when strands were dissolved after measurements for melt viscosities were made, the occurrence of a gelling was observed with regard to Comparative Example 4.

Comparative Examples 5 and 6 failed to satisfy the expression (1), they exhibited only small melt tensions, and their drawdown properties were degraded.

In Comparative Example 7, the melt tension and the entire N content became high, and its moldability and thermal stability are degraded. When strands in Comparative Example 7 were dissolved after the measurement for a melt viscosity was made, the occurrence of a gelling was observed.

TABLE 1

|  | Branching agent content (mol %) | Viscosity average molecular weight | Entire N content (ppm) | Melt tension (g) | Thermal stability ($\Delta E$) | Moldability | Drawdown property | Whether or not a gelling occurred |
|---|---|---|---|---|---|---|---|---|
| Example 1 | 0.96 | 25100 | 5 | 4.4 | 0.12 | ○ | ○ | No |
| Example 2 | 1.38 | 25000 | 6 | 6.7 | 0.13 | ○ | ○ | No |
| Example 3 | 0.76 | 24900 | 4 | 4.2 | 0.10 | ○ | ○ | No |
| Example 4 | 1.12 | 24800 | 5 | 6.1 | 0.12 | ○ | ○ | No |
| Example 5 | 0.74 | 31800 | 4 | 7.0 | 0.11 | ○ | ○ | No |
| Example 6 | 1.13 | 31900 | 5 | 7.8 | 0.12 | ○ | ○ | No |
| Example 7 | 1.34 | 31800 | 6 | 9.1 | 0.13 | ○ | ○ | No |
| Example 8 | 0.91 | 20100 | 4 | 2.3 | 0.11 | ○ | ○ | No |
| Example 9 | 0.74 | 20100 | 4 | 1.4 | 0.11 | ○ | ○ | No |
| Example 10 | 1.12 | 20000 | 6 | 2.3 | 0.14 | ○ | ○ | No |
| Example 11 | 1.27 | 20200 | 6 | 4.1 | 0.13 | ○ | ○ | No |
| Example 12 | 0.92 | 25100 | 7 | 4.1 | 0.18 | ○ | ○ | No |
| Comparative Example 1 | 1.52 | 24800 | 6 | 6.7 | 0.14 | ○ | ○ | Yes |
| Comparative Example 2 | 0.74 | 34100 | 4 | 8.3 | 0.11 | X | ○ | No |
| Comparative Example 3 | 1.13 | 33900 | 6 | 10.1 | 0.15 | X | ○ | No |
| Comparative Example 4 | 1.40 | 34200 | 6 | 11.5 | 0.14 | X | ○ | Yes |
| Comparative Example 5 | 0.75 | 17000 | 4 | 0.1 | 0.10 | ○ | X | No |
| Comparative Example 6 | 1.29 | 17000 | 6 | 2.0 | 0.15 | ○ | X | No |
| Comparative Example 7 | 0.97 | 24900 | 15 | 9.8 | 0.69 | X | ○ | Yes |

EFFECT OF THE INVENTION

The branched polycarbonate resin of this invention is remarkably free from the occurrence of a gelling and is excellent in thermal stability, moldability and drawdown property. The branched polycarbonate resin of this invention can stably permit moldings such as extrusion molding, blow molding, injection molding and vacuum molding and can be suitably used in various fields, and its effects are especially remarkable. According to the production process of this invention, a branched polycarbonate resin can be stably produced.

INDUSTRIAL UTILITY

The branched polycarbonate resin of this invention is suitably used in the fields of electric and electronic parts such as a light guiding plate, a prism sheet and a lighting fixture.

The invention claimed is:

1. A branched polycarbonate resin obtained from a dihydric phenol compound, a branching agent, monohydric phenols and phosgene by an interfacial polymerization reaction method in the presence of an alkali aqueous solution and an organic solvent, wherein the dihydric phenol compound is 2,2-bis(4-hydroxyphenyl)propane, and wherein, for the branched polycarbonate resin:

(i) the branching agent content (X) thereof is over 0.70 mol % but 1.50 mol % or less, (ii) the branching agent content (X) and the melt tension (Y) thereof at 280° C. satisfy the following expression (1), $$3.8X-2.4 \leq Y \leq 3.8X+4.5 \qquad (1),$$

and (iii) the entire N content in the branched polycarbonate resin is 0 to 7 ppm, and (iv) the branched polycarbonate resin has a viscosity average molecular weight in the range of $1.8 \times 10^4$ to $3.2 \times 10^4$.

2. The branched polycarbonate resin of claim 1, wherein the branching agent is a compound formed by substituting 3 or more hydroxyphenyl groups on an alkane having 2 to 8 carbon atoms.

3. The branched polycarbonate resin of claim 1, wherein the monohydric phenols are compounds selected from the group consisting of p-tert-butylphenol, p-tert-octylphenol, p-cumylphenol, 4-hydroxybenzophenone and phenol.

4. A process for producing the branched polycarbonate resin of claim 1, which comprises the steps of (i) blowing phosgene into an alkali aqueous solution containing a dihydric phenol compound and a branching agent in the presence of an organic solvent to allow them to react and thereby obtaining a solution containing a polycarbonate oligomer, wherein the dihydric phenol compound is 2,2-bis(4-hydroxyphenyl)propane, (ii) charging monohydric phenols into the thus-obtained solution to emulsify the solution, and (iii) polymerizing the emulsified solution without stirring.

5. The production process of claim 4, wherein the branching agent is a compound formed by substituting 3 or more hydroxyphenyl groups on an alkane having 2 to 8 carbon atoms.

6. The production process of claim 4, wherein the monohydric phenols are compounds selected from the group consisting of p-tert-butylphenol, p-tert-octylphenol, p-cumylphenol, 4-hydroxybenzophenone and phenol.

\* \* \* \* \*